(12) United States Patent
Kim

(10) Patent No.: US 9,528,628 B2
(45) Date of Patent: Dec. 27, 2016

(54) THERMO BYPASS VALVE AND METHOD FOR DETECTING FAILURE OF THE SAME

(71) Applicant: Hyundai Motor Company, Seoul (KR)

(72) Inventor: One Vai Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 378 days.

(21) Appl. No.: 14/314,713

(22) Filed: Jun. 25, 2014

(65) Prior Publication Data

US 2015/0159774 A1    Jun. 11, 2015

(30) Foreign Application Priority Data

Dec. 9, 2013   (KR) .......................... 10-2013-0152209

(51) Int. Cl.
*F16K 37/00* (2006.01)
*F01M 5/00* (2006.01)

(52) U.S. Cl.
CPC .......... *F16K 37/0041* (2013.01); *F01M 5/007* (2013.01)

(58) Field of Classification Search
CPC .......... F16K 37/0041; F01P 7/16; F01P 7/161; F01M 5/007
USPC ........................................................ 236/34.5
See application file for complete search history.

(56) References Cited

U.S. PATENT DOCUMENTS

| 3,768,731 | A | * | 10/1973 | Lavado | G05D 23/022 |
| | | | | | 236/101 B |
| 4,013,218 | A | * | 3/1977 | King | F01P 11/16 |
| | | | | | 236/34.5 |
| 5,135,163 | A | * | 8/1992 | Cho | G05D 23/132 |
| | | | | | 236/100 |
| 5,381,952 | A | * | 1/1995 | Duprez | F01P 11/16 |
| | | | | | 236/34.5 |
| 5,813,598 | A | * | 9/1998 | Kim | F01P 11/18 |
| | | | | | 236/34.5 |
| 2013/0068322 | A1 | * | 3/2013 | Kock | B60T 17/04 |
| | | | | | 137/468 |

FOREIGN PATENT DOCUMENTS

| JP | 05131830 A | 5/1993 |
| JP | 10-30420 A | 2/1998 |
| JP | 11-201265 A | 7/1999 |
| JP | 2000320576 A | 11/2000 |
| JP | 2007192406 A | 8/2007 |
| KR | 100224349 B1 | 7/1999 |
| KR | 100240149 B1 | 10/1999 |

(Continued)

*Primary Examiner* — Marc Norman
(74) *Attorney, Agent, or Firm* — Morgan, Lewis & Bockius LLP

(57) ABSTRACT

Disclosed are a thermo bypass valve and a method for detecting a failure of the thermo bypass valve. The thermo bypass valve is configured to include a valve body configured to make an outlet passage and a bypass passage communicate with an inlet passage within an inner space of the valve body, a piston assembly disposed in the inner space of the valve body and have a thermal expansion material received in the piston assembly, and an elastic member disposed between the piston assembly and an inner surface of the valve body. Thus, the thermo bypass valve and the method of the present invention are capable of radically preventing oil from overheating at the time of the failure of a valve due to the leak of the thermal expansion material.

14 Claims, 3 Drawing Sheets

(56) References Cited

FOREIGN PATENT DOCUMENTS

| KR | 10-2002-0055082 A | 7/2002 |
|----|-------------------|--------|
| KR | 1020050038486 A | 4/2005 |
| KR | 10-2010-0032314 A | 3/2010 |

\* cited by examiner

THERMO BYPASS VALVE AND METHOD FOR DETECTING FAILURE OF THE SAME

CROSS REFERENCE TO RELATED APPLICATION

The present application claims priority of Korean Patent Application Number 10-2013-0152209 filed on Dec. 9, 2013, the entire contents of which application are incorporated herein for all purposes by this reference.

BACKGROUND OF INVENTION

Field of Invention

The present invention relates to a thermo bypass valve, and more particularly, to a thermo bypass valve to sense a failure situation of a valve due to a leak of a thermal expansion material filled in the valve and prevent oil from overheating at the time of a failure situation and a method for controlling a failure of the thermo bypass valve.

Description of Related Art

In a vehicle, oil is supplied to lubricate an engine, in which the oil is supplied through oil passages which are formed in each lubrication part, a cylinder block, and a cylinder head in the engine to serve to reduce a friction of the entire engine, prevent the engine from wearing, and cool heat of a friction portion or heat of a piston.

Referring to FIG. 1, the engine oil stored in an oil pan 1 is pumped by an oil pump 2 when the engine is operated and is supplied to an oil filter 3 and supplied to a main gallery 4 formed in the cylinder block and the cylinder head via the oil filter 3 to perform a lubrication action and the engine oil which finishes the lubrication action again drops to the oil pan 1 at a lower portion of the cylinder block and is stored in the oil pan to repeat the above action.

Meanwhile, when a temperature of the oil suddenly rises, there is a need to cool the oil. In this case, the oil is cooled by passing through an oil cooler 6 through a thermostat valve 5 and then is pumped to the oil filter.

However, the failure situation of the valve which causes a wax (thermal expansion material) filled in a thermostat to be leaked due to various causes during an operation of the valve may occur. In this case, the piston does not move and thus the thermostat is not operated, such that the oil flows in the oil filter at all times independent of the temperature of the oil, thereby causing the engine oil to overheat.

Meanwhile, Korean Patent Laid-Open Publication No. 10-2005-0038486 entitled "Bypass Structure of Engine Oil Filter Bracket Having Relief Valve in Response to Temperature" has been introduced.

However, there is a problem in that the above method hardly determines the failure situation of the valve.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a thermo bypass valve to sense a failure situation of a valve due to a leak of a thermal expansion material filled in the valve and prevent oil from overheating at the time of a failure situation and a method for controlling a failure of the thermo bypass valve.

According to various aspects of the present invention, there is provided a thermo bypass valve, including: a valve body configured to make an outlet passage and a bypass passage communicate with an inlet passage within an inner space thereof so that a fluid introduced from an outside is selectively discharged or bypassed via the inner space thereof, a piston assembly disposed in the inner space of the valve body and have a thermal expansion material received therein to make the inlet passage selectively communicate with the outlet passage or the bypass passage at a time of substantially linearly moving the piston assembly by expanding or contracting the thermal expansion material depending on a temperature of the fluid, and an elastic member disposed between the piston assembly and an inner surface of the valve body and providing an elastic repulsive force to the piston assembly in a direction in which the piston assembly moves at the time of contracting or leaking the thermal expansion material to make the inlet passage communicate with the bypass passage.

The fluid may be oil, a middle portion of the valve body may be provided with the inlet passage which is connected to an oil pan to be introduced with the oil, and one end of the valve body may be provided with the outlet passage which is connected to a main gallery to discharge the oil, and the other end of the valve body may be provided with the bypass passage which is connected to an oil cooler to bypass the oil.

The piston assembly may include a piston configured to substantially linearly move within the inner space of the valve body, a spool configured to have one end fixed to an inner end of the valve body and the other end inserted into the piston to guide the movement of the piston, and the thermal expansion material configured to be received in the piston into which the other end of the spool is inserted and be expanded or contracted by having an expansion coefficient increased as the temperature is increased and the expansion coefficient decreased as the temperature is decreased so as to substantially linearly move the piston.

The elastic member may be a compression spring and both ends of the elastic member may be disposed at one end portion of the spool and may be supported between the piston and the valve body to provide the elastic repulsive force to the piston. The elastic repulsive force of the elastic member may be smaller than an expansion force or a contraction force of the thermal expansion material.

The thermo bypass valve may further include a restricting means configured to guide a substantially linear movement of the piston assembly moving along the inner surface of the valve body and restrict the movement of the piston assembly when the piston assembly moves in a maximal moving displacement permitted by the elastic repulsive force of the elastic member due to the leaking of the thermal expansion material.

The restriction means may include a sleeve configured to be inserted between the valve body and the piston assembly, provided with a slit along a moving direction of the piston assembly, and provided with a locking part by bending an end of the slit to one side thereof, and a stopper protrusion configured to be formed on an outer surface of the piston assembly and guided along the slit at the time of moving the piston assembly and move from the end of the slit to the locking part to be locked to the locking part.

A maximal free length of the elastic member may be longer than a length of the maximal moving displacement of the piston assembly.

The slit may be obliquely formed with respect to a virtual horizontal surface formed in a longitudinal direction of the sleeve. The slit may be formed to include a plurality of slits and the stopper protrusion may be formed to include a plurality of stopper protrusions formed on the outer surface of the piston assembly to correspond to the plurality of slits.

The thermo bypass valve may further include a sensing means configured to sense the locking of the stopper protrusion by an electrical contact signal when the stopper protrusion is locked to the locking part, and a control unit configured to receive the electrical contact signal and perform a control to output a failure signal of the thermo bypass valve if the electrical contact signal is received.

In the sensing means, an electrode may be installed in an inner surface of the sleeve, the outer surface of the piston assembly contacting the electrode may be formed of a conductor, and the electrical signal depending on electric conduction may be sensed by a sensor when the electrode contacts the outer surface of the piston assembly. The electrode may be installed at a position adjacent to the locking part and the stopper protrusion formed on the outer surface of the piston assembly may be formed of a conductor.

According to various other aspects of the present invention, there is provided a method for determining and detecting a failure of the thermo bypass valve as described above, including: sensing the locking of the stopper protrusion by the electrical contact signal when the stopper protrusion formed on the piston assembly is locked to the locking part formed on the sleeve, and outputting the failure signal of the thermo bypass valve if the locking of the stopper protrusion is sensed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
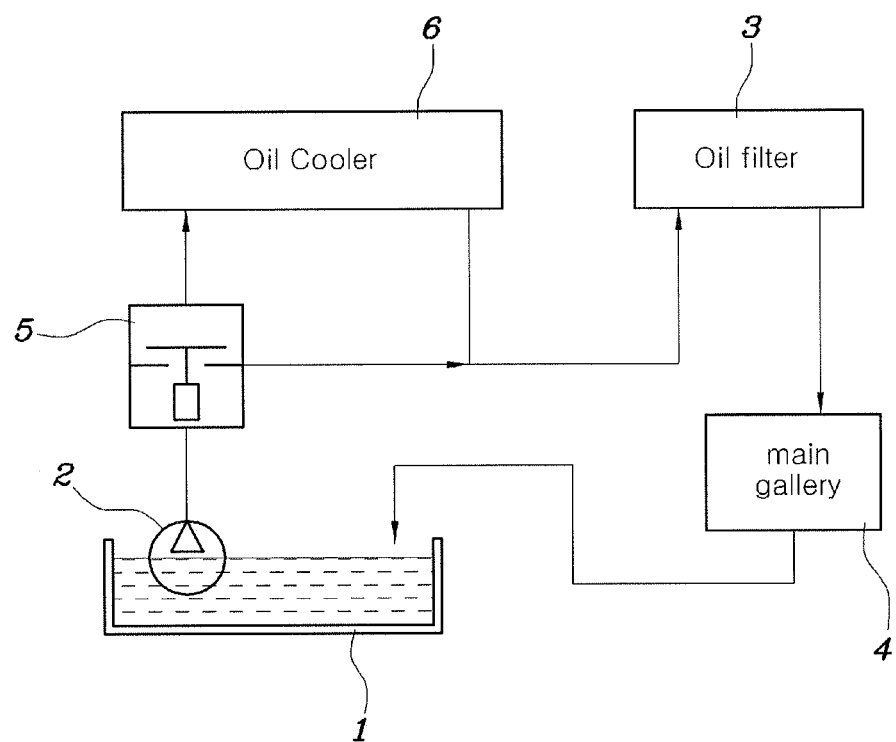
FIG. 1 is a diagram for describing a flow passage of oil.
Figure 2:
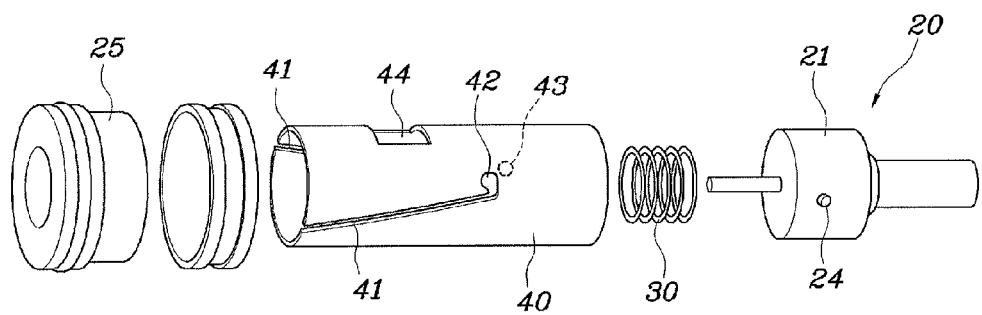
FIG. 2 illustrates a separated structure of an exemplary thermo bypass valve according to the present invention.
Figure 3:
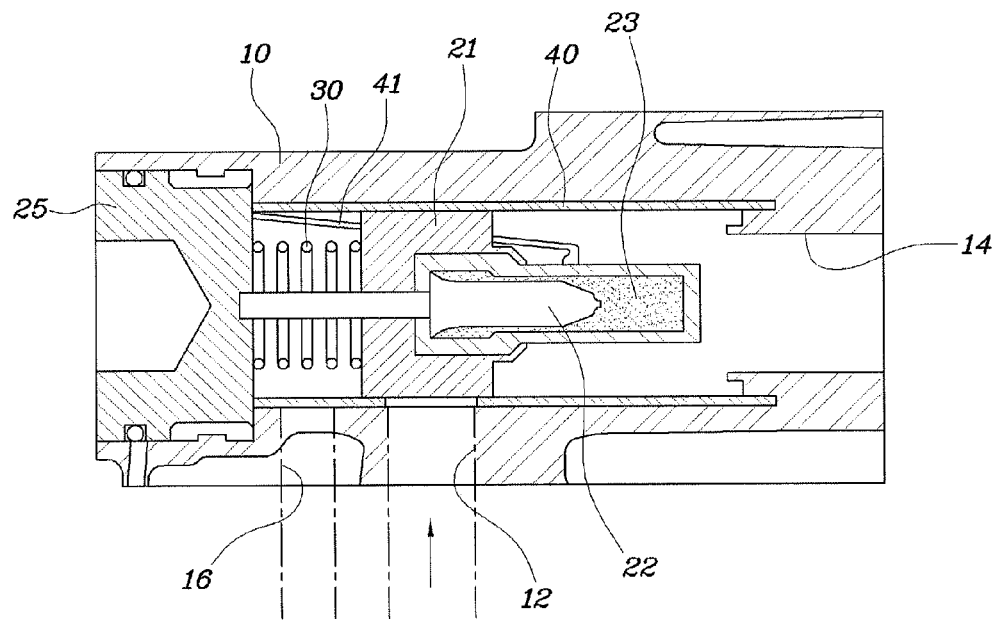
FIG. 3 illustrates a coupled structure of an exemplary thermo bypass valve according to the present invention.
Figure 4:
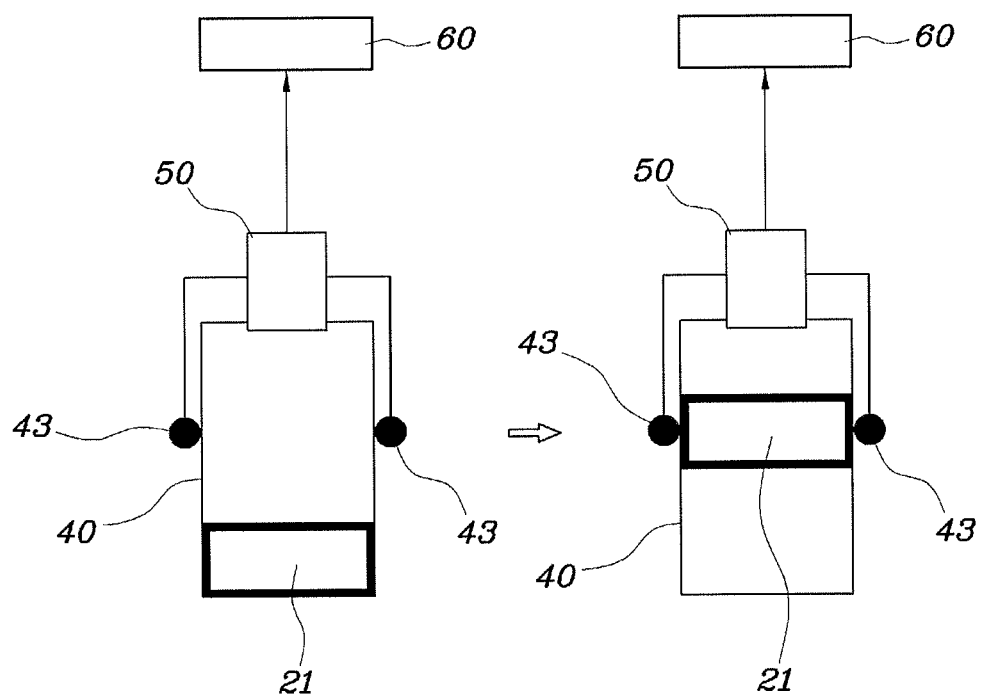
FIG. 4 illustrates an exemplary method for detecting a failure of a thermo bypass valve according to the present invention.

FIG. 2 is a diagram illustrating a separated structure of a thermo bypass valve, FIG. 3 is a diagram for describing a coupled structure of the thermo bypass valve, and FIG. 4 is a diagram for describing a method for detecting a failure of a thermo bypass valve according to various embodiments of the present invention. The thermo bypass valve according to various embodiments of the present invention is configured to include a valve body 10, a piston assembly 20, and an elastic member 30.

Various embodiments of the present invention will be described in detail with reference to FIGS. 2 and 3. The thermo bypass valve is configured to include: a valve body 10 formed to make an outlet passage 14 and a bypass passage 16 communicate with an inlet passage 12 within an inner space thereof so that a fluid introduced from the outside is discharged or bypassed via the inner space thereof; the piston assembly 20 disposed in the inner space of the valve body 10 and having a thermal expansion material 23 received therein to make the inlet passage 12 selectively communicate with the outlet passage 14 or the bypass passage 16 when the piston assembly 20 moves linearly or substantially linearly by expanding or contracting the thermal expansion material 23 depending on a temperature of the fluid; and the elastic member 30 disposed between the piston assembly 20 and an inner surface of the valve body 10 and providing an elastic repulsive force to the piston assembly 20 in a direction in which the piston assembly 20 moves at the time of contracting or leaking the thermal expansion material 23 to make the inlet passage 12 communicate with the bypass passage 16.

In this case, the fluid is oil, and a middle portion of the valve body 10 may be provided with the inlet passage 12 which is connected to an oil pan to be introduced with the oil, one end of the valve body 10 may be provided with the outlet passage 14 which is connected to a main gallery to discharge the oil, and the other end of the valve body 10 may be provided with the bypass passage 16 which is connected to an oil cooler to bypass the oil.

Referring to FIG. 3, the inlet passage 12 may be disposed at the middle portion of the valve body 10, the outlet passage 14 may be disposed at the right of the valve body 10, and the bypass passage 16 may be disposed at the left of the valve body 10. Further, the thermal expansion material 23 may be a wax as a material which is expanded or contracted depending on temperature.

That is, in an operation state of the normal valve, the thermal expansion material 23 is expanded or contracted depending on the temperature of the oil, and thus the piston assembly 20 moves linearly or substantially linearly within the valve body 10, such that the inlet passage 12 selectively communicates with the outlet passage 14 or the bypass passage 16. Therefore, when the temperature of the oil introduced into the valve body 10 through the inlet passage 12 is a low temperature, the outlet passage 14 is opened and thus the oil is circulated to the oil filter connected to the outlet passage 14, whereas when the temperature of the oil is a high temperature, the bypass passage 16 is opened and thus the oil is circulated to the oil cooler connected to the bypass passage 16.

However, in the case of the failure situation of the valve, in particular, in the case in which the thermal expansion material 23 is leaked within the valve body 10, the piston assembly 20 moves by the elastic repulsive force of the elastic member 30 to forcibly switch the inlet passage 12 and the bypass passage 16 in a communication state therebetween, such that the oil is circulated to the oil cooler connected to the bypass passage 16. Therefore, at the time of the failure of the valve due to the leak of the thermal expansion material 23, the overheating of the oil may be radically prevented.

According to various embodiments of the present invention, the piston assembly 20 may be configured to include: a piston 21 linearly or substantially linearly moving within the inner space of the valve body 10; a spool 22 having one end fixed to an inner end of the valve body 10 and the other end inserted into the piston 21 to guide the movement of the piston 21; and the thermal expansion material 23 received in the piston 21 into which the other end of the spool 22 is inserted and being expanded or contracted by having an expansion coefficient increased as the temperature is increased and the expansion coefficient decreased as the temperature is decreased so as to linearly or substantially linearly move the piston 21.

In this case, the end of the valve body 10 may be provided with a plug 25 and the plug 25 may be fixed with one end of the spool 22.

Further, the elastic member 30 is a compression spring and both ends of the elastic member 30 at one end of the spool 22 are supported between the piston 21 and the valve body 10 to provide the elastic repulsive force to the piston 21.

Herein, the elastic repulsive force of the elastic member 30 may be set to be smaller than an expansion force and a contraction force of the thermal expansion material 23. That is, in the normal state of the valve, the movement of the piston 21 is determined by the expansion force and the contraction force of the thermal expansion material 23 and at the time of leaking the thermal expansion material 23, the piston 21 may move by the elastic repulsive force of the compression spring.

Meanwhile, according to various embodiments of the present invention, the thermo bypass valve further includes a restricting means which is disposed to guide the linear movement of the piston assembly 20 moving along the inner surface of the valve body 10 and restricts the movement of the piston assembly 20 due to the leak of the thermal expansion material 23, when the piston assembly 20 moves in a maximum moving displacement in which the elastic repulsive force of the elastic member 30 is permitted.

In detail, the restriction means may be configured to include: a sleeve 40 inserted between the valve body 10 and the piston assembly 20, provided with a slit 41 along the moving direction of the piston assembly 20, and provided with a locking part 42 by bending an end of the slit 41 to one side thereof; and a stopper protrusion 24 formed on an outer surface of the piston assembly 20, guided along the slit 41 at the time of moving the piston assembly 20, and moving from the end of the slit 41 to the locking part 42 to be locked to the locking part 42.

In this case, a maximum free length of the elastic member 30 (compression spring) may be set to be longer than a length of the maximum moving displacement of the piston assembly 20.

Further, a middle portion of the sleeve 40 is provided with an inlet hole 44 which communicates with the inlet passage 12, such that the oil may be introduced into the sleeve 40 through the inlet passage 12.

That is, at the time of leaking the thermal expansion material 23, the stopper protrusion 24 formed on the outer surface of the piston 21 moves while being guided to the slit 41 at the time of moving the piston 21 by the elastic repulsive force of the elastic member 30. To be continued, the stopper protrusion 24 is seated and supported to the locking part 42 while moving to the locking part 42 formed at the end of the slit 41 by the elastic repulsive force of the elastic member 30 in the state in which the stopper protrusion 24 is disposed at the end of the slit 41.

Therefore, the position of the piston 21 not only depends on the elastic repulsive force of the elastic member 30 but also is mechanically restricted by the structure of the locking part 42, such that the position of the piston 21 is not changed by an external force, thereby stably circulating the oil to the bypass passage 16.

Further, the slit 41 may be obliquely formed with respect to a virtual horizontal surface formed in a longitudinal direction of the sleeve 40. Further, the slit 41 may be formed in plural and a plurality of stopper protrusions 24 may be formed on the outer surface of the piston assembly 20 to correspond to the slits 41. Preferably, in some embodiments, the slit 41 may be symmetrically or substantially symmetrically formed with respect to a central axis of the sleeve 40. Therefore, the unexpected abnormal behavior of the piston 21 is prevented.

Further, according to various embodiments of the present invention, the thermo bypass valve may be configured to further include a sensing means sensing the locking of the stopper protrusion 24 such as by an electrical contact signal when the stopper protrusion 24 is locked to the locking part 42 and a control unit 60 receiving the electrical contact signal and performing a control to output the failure signal of the thermo bypass valve at the time of inputting the electrical contact signal.

In detail, in the sensing means, an electrode 43 is installed in the inner surface of the sleeve 40, the outer surface of the piston assembly 20 contacting the electrode 43 is formed of a conductor, and the electrical signal depending on the electric conduction may be sensed by a sensor 50 when the electrode 43 contacts the outer surface of the piston assembly 20.

Herein, the electrode 43 is installed at a position adjacent to the locking part 42 and the piston 21 formed with the stopper protrusion 24 may be formed of a conductor. That is, when the stopper protrusion 24 is locked to the locking part 42 at the time of the movement of the piston 21 due to the leak of the thermal expansion material 23, since the piston 21 is formed of the conductor, the sensor 50 senses the electrical contact signal by electric conduction while the piston 21 contacting the electrode 43.

Therefore, the contact signal sensed by the sensor 50 is transmitted to the control unit 60 and the control unit 60 recognizes it as the failure situation to be able to perform a control to issue an alarm warning the failure situation or display a warning light to a cluster. Herein, the control unit 60 may be an ECU.

Meanwhile, the method for detecting a failure of a thermo bypass valve according to various embodiments of the present invention may be configured to largely include sensing and outputting. Referring to FIGS. 3 and 4, according to various embodiments of the present invention, the method for detecting a failure of a thermo bypass valve may be configured to include: sensing the locking of the stopper protrusion 24 by the electrical contact signal when the stopper protrusion 24 formed on the piston assembly 20 is locked to the locking part 42 formed on the sleeve 40; and outputting the failure signal of the thermo bypass valve at the time of sensing the contact signal.

That is, as described above, when the stopper protrusion 24 is locked to the locking part 42 at the time of moving the piston 21 due to the leak of the thermal expansion material 23, the electrical contact signal is sensed by the electric conduction while the piston 21 contacting the electrode 43 and the sensed contact signal is transmitted to the control unit 60. Therefore, the control unit 60 determines and recognizes it as the failure situation of the thermo bypass valve to be able to output the failure signal.

According to various embodiments of the present invention, when the thermal expansion material is leaked, the inlet passage and the bypass passage are controlled to be forcibly maintained in the communication state therebetween by allowing the elastic repulsive force of the elastic member to move the piston assembly so as to circulate the oil to the oil cooler, thereby radically preventing the oil from overheating at the time of the failure of the valve due to the leak of the thermal expansion material.

Further, when the piston moves due to the leak of the thermal expansion material, the movement of the piston is sensed by the electrical signal to recognize the failure situation, thereby easily recognizing the failure situation of the valve.

For convenience in explanation and accurate definition in the appended claims, the terms "upper" or "lower", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A thermo bypass valve, comprising:
   a valve body configured to make an outlet passage and a bypass passage communicate with an inlet passage within an inner space thereof so that a fluid introduced from an outside is selectively discharged or bypassed via the inner space thereof;
   a piston assembly disposed in the inner space of the valve body and have a thermal expansion material received therein to make the inlet passage selectively communicate with the outlet passage or the bypass passage at a time of substantially linearly moving the piston assembly by expanding or contracting the thermal expansion material depending on a temperature of the fluid; and
   an elastic member disposed between the piston assembly and an inner surface of the valve body and providing an elastic repulsive force to the piston assembly in a direction in which the piston assembly moves at the time of contracting or leaking the thermal expansion material to make the inlet passage communicate with the bypass passage.

2. The thermo bypass valve of claim 1, wherein the fluid is oil,
   a middle portion of the valve body is provided with the inlet passage which is connected to an oil pan to be introduced with the oil,
   one end of the valve body is provided with the outlet passage which is connected to a main gallery to discharge the oil, and
   the other end of the valve body is provided with the bypass passage which is connected to an oil cooler to bypass the oil.

3. The thermo bypass valve of claim 1, wherein the piston assembly includes:
   a piston configured to substantially linearly move within the inner space of the valve body;
   a spool configured to have one end fixed to an inner end of the valve body and the other end inserted into the piston to guide the movement of the piston; and
   the thermal expansion material configured to be received in the piston into which the other end of the spool is inserted and be expanded or contracted by having an expansion coefficient increased as the temperature is increased and the expansion coefficient decreased as the temperature is decreased so as to substantially linearly move the piston.

4. The thermo bypass valve of claim 3, wherein the elastic member is a compression spring, and both ends of the elastic member are disposed at one end portion of the spool and supported between the piston and the valve body to provide the elastic repulsive force to the piston.

5. The thermo bypass valve of claim 4, wherein the elastic repulsive force of the elastic member is smaller than an expansion force or a contraction force of the thermal expansion material.

6. The thermo bypass valve of claim 1, further comprising:
   a restricting means configured to guide a substantially linear movement of the piston assembly moving along the inner surface of the valve body and restrict the movement of the piston assembly when the piston assembly moves in a maximal moving displacement permitted by the elastic repulsive force of the elastic member due to the leaking of the thermal expansion material.

7. The thermo bypass valve of claim 6, wherein the restriction means includes:
   a sleeve configured to be inserted between the valve body and the piston assembly, provided with a slit along a moving direction of the piston assembly, and provided with a locking part by bending an end of the slit to one side thereof; and
   a stopper protrusion configured to be formed on an outer surface of the piston assembly and guided along the slit at the time of moving the piston assembly and move from the end of the slit to the locking part to be locked to the locking part.

8. The thermo bypass valve of claim 7, wherein the slit is obliquely formed with respect to a virtual horizontal surface formed in a longitudinal direction of the sleeve.

9. The thermo bypass valve of claim 7, wherein the slit is formed to include a plurality of slits and the stopper protrusion is formed to include a plurality of stopper protrusions formed on the outer surface of the piston assembly to correspond to the plurality of slits.

10. The thermo bypass valve of claim 7, further comprising:
    a sensing means configured to sense the locking of the stopper protrusion by an electrical contact signal when the stopper protrusion is locked to the locking part; and
    a control unit configured to receive the electrical contact signal and perform a control to output a failure signal of the thermo bypass valve if the electrical contact signal is received.

11. The thermo bypass valve of claim 10, wherein in the sensing means, an electrode is installed in an inner surface of the sleeve, the outer surface of the piston assembly contacting the electrode is formed of a conductor, and the electrical signal depending on electric conduction is sensed by a sensor when the electrode contacts the outer surface of the piston assembly.

12. The thermo bypass valve of claim 11, wherein the electrode is installed at a position adjacent to the locking part, and the stopper protrusion formed on the outer surface of the piston assembly is formed of a conductor.

13. A method for determining and controlling a failure of the thermo bypass valve of claim 10, comprising:

sensing the locking of the stopper protrusion by the electrical contact signal when the stopper protrusion formed on the piston assembly is locked to the locking part formed on the sleeve; and outputting the failure signal of the thermo bypass valve if the locking of the stopper protrusion is sensed.

14. The thermo bypass valve of claim 6, wherein a maximal free length of the elastic member is longer than a length of the maximal moving displacement of the piston assembly.

* * * * *